(12) United States Patent
Harrison (10) Patent No.: US 8,297,138 B2
(45) Date of Patent: Oct. 30, 2012

(54) GYROSCOPIC TORQUE CONVERTER

(76) Inventor: Dunkan James Harrison, Greater London (GB)

( * ) Notice: Subject to any disclaimer, the term of this patent is extended or adjusted under 35 U.S.C. 154(b) by 726 days.

(21) Appl. No.: 12/522,573

(22) PCT Filed: Dec. 27, 2007

(86) PCT No.: PCT/GB2007/050790
§ 371 (c)(1),
(2), (4) Date: Jul. 29, 2009

(87) PCT Pub. No.: WO2008/084195
PCT Pub. Date: Jul. 17, 2008

(65) Prior Publication Data
US 2010/0132489 A1    Jun. 3, 2010

(30) Foreign Application Priority Data
Jan. 12, 2007    (GB) .................................. 0700658.8

(51) Int. Cl.
*G01C 19/06*    (2006.01)
*G01C 19/30*    (2006.01)
*G01C 19/46*    (2006.01)

(52) U.S. Cl. .......................................... 74/5.37; 74/5.42

(58) Field of Classification Search ............... 74/5.34, 74/5.37, 5.42, 5.5, 5.8, 5.9, 5.95, 64, 112, 74/126, 640, 665 GB, 665 M
See application file for complete search history.

(56) References Cited

U.S. PATENT DOCUMENTS

| | | | | |
|---|---|---|---|---|
| 2,389,826 A | * | 11/1945 | Stalker ........................... | 475/268 |
| 2,606,448 A | * | 8/1952 | Norden et al. ................. | 74/5.34 |
| 3,451,275 A | * | 6/1969 | Atkin ............................. | 74/5.34 |
| 3,483,760 A | * | 12/1969 | Hurlburt ......................... | 74/5 F |
| 3,742,770 A | * | 7/1973 | Flannelly ....................... | 74/5.34 |
| 3,851,545 A | | 12/1974 | Gumlich | |
| 4,161,889 A | | 7/1979 | Hinds | |
| 4,169,391 A | | 10/1979 | Schonberger | |
| 4,361,055 A | | 11/1982 | Kinson | |

(Continued)

FOREIGN PATENT DOCUMENTS

| | | |
|---|---|---|
| AU | 2004100816 A4 | 11/2004 |
| DE | 2105939 | 2/1972 |
| DE | 2126292 | 12/1972 |

(Continued)

*Primary Examiner* — David D Le
*Assistant Examiner* — Michael Gonzalez
(74) *Attorney, Agent, or Firm* — Shalom Wertsberger; Saltamar Innovations (57) ABSTRACT

A torque converter comprises a stationary mount, input and output shafts, a primary frame (301) supported by the stationary mount for rotation about a primary axis and coupled for rotation with one of the input and output shafts (302,303), a secondary frame (50) supported by the primary frame (301) for rotation about a secondary axis perpendicular to the primary axis and coupled for rotation with the other of the input and output shafts, a plurality of flywheels (10) supported by the secondary frame (50) with their spin axes disposed at an angle to one another in the same plane, or in mutually parallel planes, and torsional springs acting between the flywheels and the secondary frame to cause the flywheels to oscillate in use, so as to effect a gyroscopic torque coupling between the primary and secondary frames. An excitation system (110) is mounted on the primary frame (301) for applying to each flywheel (50) a periodic torque that varies with the angular velocity of the secondary frame and the angular position of the axis of the flywheel relative to the secondary axis, so as to cause each flywheel to oscillate at its natural frequency in response to relative rotation between the primary and secondary frames.

15 Claims, 8 Drawing Sheets

U.S. PATENT DOCUMENTS

| | | | | |
|---|---|---|---|---|
| 4,784,006 A | * | 11/1988 | Kethley | 74/84 R |
| 5,109,719 A | * | 5/1992 | Piokins, Jr. | 74/5.37 |
| 5,256,942 A | * | 10/1993 | Wood | 318/649 |
| 6,305,647 B1 | * | 10/2001 | Defendini et al. | 244/165 |
| 6,571,652 B2 | * | 6/2003 | Adcock | 74/5.9 |
| 6,729,197 B2 | * | 5/2004 | Adcock | 74/5.9 |
| 7,185,855 B2 | * | 3/2007 | Peck | 244/165 |
| 2003/0159532 A1 | * | 8/2003 | Adcock | 74/5 R |

FOREIGN PATENT DOCUMENTS

| | | |
|---|---|---|
| DE | 4337858 | 5/1995 |
| GB | 1421309 | 1/1976 |
| SU | 1174641 A | 8/1985 |
| WO | WO93/17261 A1 | 9/1993 |
| WO | WO00/45068 A1 | 8/2000 |
| WO | WO2004/003405 A1 | 1/2004 |

* cited by examiner

GYROSCOPIC TORQUE CONVERTER

FIELD OF THE INVENTION

The present invention relates to a torque converter for transmitting torque from an input shaft to an output shaft that may rotate at a different speed from the input shaft. In particular, the invention is concerned with a torque converter which relies on precession as a means of generating output torque.

BACKGROUND OF THE INVENTION

When a mass having angular momentum around a spin axis, has a torque applied to it around any axis that is not parallel to the spin axis, the mass is caused to rotate about an axis perpendicular to the axis of the applied torque and the spin axis, this motion is termed precession. Such torque-induced precession, also termed gyroscopic precession, is the cause of the wobbling of the axis of a spinning object and is commonly seen in a spinning top toy.

In a gyroscope, a spinning mass is gimbal mounted so that it may rotate about three axes. In particular, the gimbal mounting comprises an outer or primary frame that is pivotable about a first axis relative to a stationary mount. An inner or secondary frame is supported by the primary frame for rotation about a second axis inclined relative to the first axis. The spinning mass is in turn supported on the secondary frame by means of a spindle of which the axis is inclined relative to the second axis. In such a gyroscope, if a torque is applied in some way to cause the secondary frame to rotate with respect to the primary frame, then the primary frame will also experience a torque causing it to rotate.

The torque converter of the present invention is based on this same principle that if a torque from an input shaft is applied to one of the two frames of a gimbal mounted spinning mass then the other frame will experience a torque which can be applied to an output shaft to serve as output torque.

However, if the mass is spinning constantly in the same direction within the secondary frame and a torque is applied to make the secondary frame rotate always in the same direction with respect to the primary frame, then the direction of the resultant torque on the primary frame will oscillate at a frequency determined by the speed of rotation of the secondary frame within the primary frame. This is because the direction of the torque depends on the direction in which the angular momentum vector is pointing. An additional step needs therefore to be taken if one is to produce a torque converter in which the input and output shafts both rotate constantly in the same direction.

There are different approaches for achieving this objective, which are considered below. In particular, in order to maintain a constant output, a torque converter must resort to one of the following possibilities, namely:

(i) Oscillating primary frame
(ii) Oscillating secondary frame
(iii) Oscillating Masses
(iv) Variable Moment of Inertia (no examples)

Examples of the first three approaches have been proposed in the prior art and are discussed below. The fourth is mentioned here only as a theoretical possibility because it appears not to have been attempted and, indeed, is not used in the present invention.

(i) Oscillating Primary Frames

In U.S. Pat. No. 6,729,197, a continuously rotating flywheel is mounted in a sub-frame, which is itself driven continuously from an independent axle, via gearing. The main frame experiences an oscillating torque which drives an output shaft. A one-way roller clutch is used to rectify the motion of the output shaft.

In U.S. Pat. No. 4,161,889 and WO 2005/071257 are other examples of the oscillating primary frame type.

(ii) Oscillating Secondary Frames

WO 00/45068 discloses a device which consists of an inertial body mounted on a linkage, which is cyclically deflected. The reaction forces generated by the inertial body as it is being cyclically deflected are applied to a torque shaft. The motion is rectified using two one-way clutches and some gearing.

Other prior art references which rely on oscillating secondary frames include AU 2004100816, U.S. Pat. No. 4,361,055, DE OS 2,105,939, DE 2,126,292, SU 1174641, U.S. Pat. No. 3,851,545, WO 04/003405, and GB 1,421,309. As the present invention does not use an oscillating secondary frame, the latter patents are mentioned only for completeness and need not be described in detail.

(iii) Oscillating Masses

As will be described in more detail below, this is the approach adopted by the present invention and accordingly the references discussed below are believed to constitute the most pertinent prior art.

WO 93/17261 discloses one or more inertial masses or flywheels mounted in a secondary frame, which is in turn mounted in a primary frame. The reference assumes that when the primary and secondary frame are both rotated simultaneously, the inertial mass will experience an oscillating torque around the spin axis, that is at a maximum when the spin axis is at right angles to the primary axis. It is noted in the reference that that the assumed angular motion of the inertial masses is 90° out of phase from that required to generate continuous gyro torque between the primary and secondary frames. Each flywheel is therefore coupled to a pump which drives a hydraulic fluid through a hydraulic line that passes along the secondary frame axle, through a seal and then along the primary frame to a turbine mounted on the primary frame shaft. The hypothesis is that the pumps create a phase difference in the flywheel motion due to the damping of the hydraulic system, the energy being recycled to the device via the turbine. The reference also proposes the use of two helical springs per flywheel mounted between lugs on the flywheel and lugs on the secondary frame, to assist the vibration.

The assumption made in the patent that when the primary and secondary frames are both rotated simultaneously the inertial masses will experience an oscillating torque around their spin axis is believed not to be correct. Experimental attempts by the present inventor to cause flywheels to oscillate in this manner proved unsuccessful and this can also be shown mathematically to be an erroneous assumption.

DE 4,337,858 discloses three oscillating masses arranged at 120° angles around the secondary axis. The oscillation is driven by a reciprocating rod mounted in the primary frame shaft. The rod connects to the masses via a system of cams, gears and pin jointed rods.

OBJECT OF THE INVENTION

The aim of the present invention is to provide a torque converter for smoothly driving an output shaft at a speed that is different from the speed of rotation of an input shaft and which relies on precession as a means of generating output torque.

SUMMARY OF THE INVENTION

According to the present invention, there is provided a torque converter comprising a stationary mount, input and output shafts, a primary frame supported by the stationary mount for rotation about a primary axis and coupled for rotation with one of the input and output shafts, a secondary frame supported by the primary frame for rotation about a secondary axis perpendicular to the primary axis and coupled for rotation with the other of the input and output shafts, a plurality of flywheels supported by the secondary frame with their spin axes disposed at an angle to one another in the same plane, or in mutually parallel planes, and torsional springs acting between the flywheels and the secondary frame to cause the flywheels to oscillate in use, so as to effect a gyroscopic torque coupling between the primary and secondary frames; characterised by an excitation system mounted on the primary frame for applying to each flywheel a periodic torque that varies with the angular velocity of the secondary frame and the angular position of the axis of the flywheel relative to the secondary axis, so as to cause each flywheel to oscillate in response to relative rotation between the primary and secondary frames.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

Spin System

FIGS. 1a to 1d show different possible configurations of flywheels and torsional springs, herein referred to as spin systems.

Figure 1A:
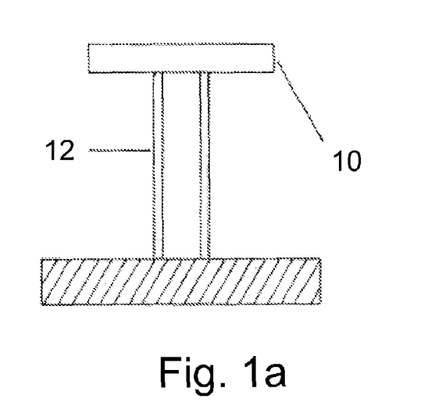
FIGS. 1a to 1d are sections through different configurations of flywheels and torsional springs.

FIG. 1a shows a cross-sectional view of a disc or flywheel 10 attached to a hollow cylindrical spring 12, which is in turn mounted on a surface indicated by the hatched box.

Figure 1B:
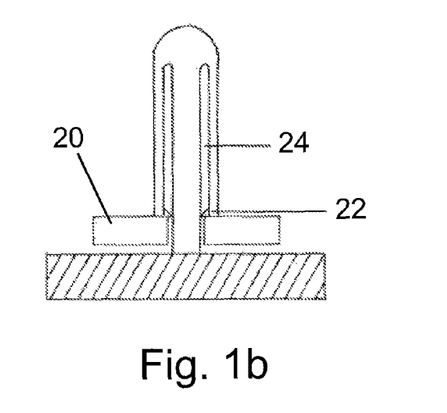

FIG. 1b shows a cross-sectional view of a disc 20 attached to a spring arrangement that consists of a hollow cylindrical spring 22 and a concentric solid cylindrical spring 24, the latter being mounted on a surface.

Figure 1C:
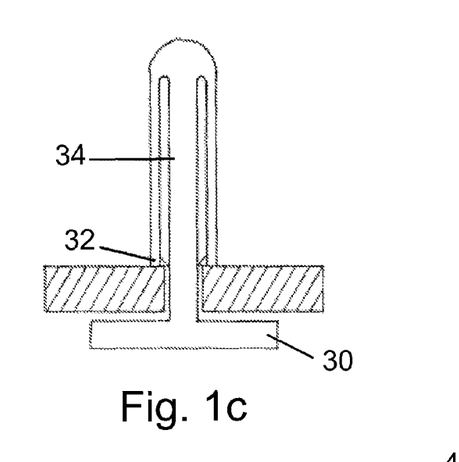

In FIG. 1c, the disc 30 is attached to a spring arrangement that again consists of a solid cylindrical 34 spring and a concentric hollow cylindrical spring 32 but in this embodiment it is the hollow spring that is mounted on a surface.

Figure 1D:
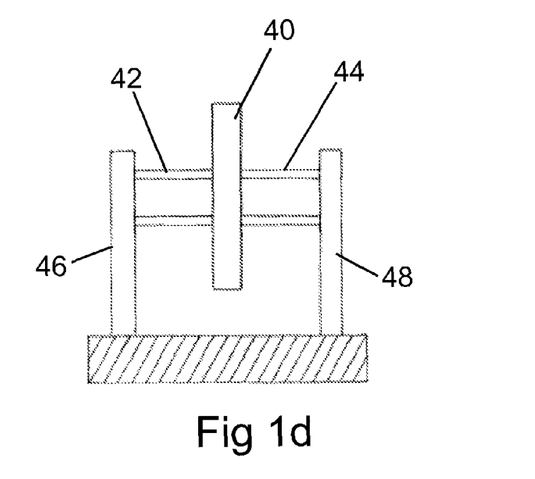

FIG. 1d shows a cross-sectional view of a disc 40 attached to two hollow cylindrical springs 42, 44 of which the outer opposite ends are attached to two supports 46, 48 which form a yoke arrangement with the surface.

Secondary Frame

FIGS. 2a to 2f show different possible configurations for the secondary frame.

Figures 2A, 2B, 2C, 2D, 2E, 2F:
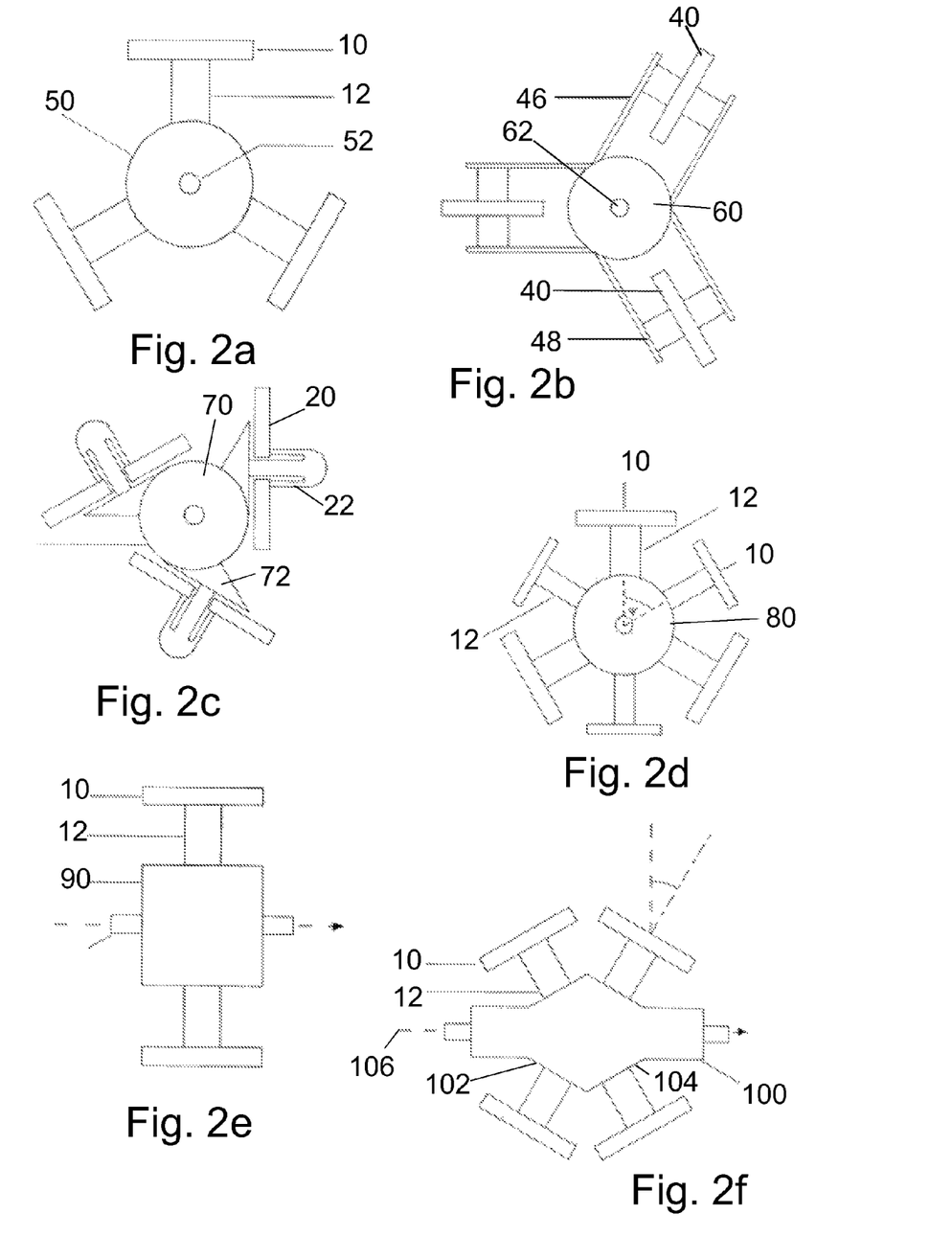
FIGS. 2a to 2f show different configurations for mounted flywheels on a secondary frame.

FIG. 2a shows a cross-sectional drawing of three identical spin systems of type shown in FIG. 1a mounted around the circumference of a cylinder 50 rotatable about an axle 52.

FIG. 2b shows a cross-sectional drawing of three identical spin systems of type shown in FIG. 2d mounted around the circumference of a cylinder 60.

FIG. 2c shows a cross-sectional drawing of a cylinder 70 with three supports 72 mounted tangentially on its circumference. Three identical spin systems of type shown in FIG. 1b are mounted one on each support 72.

FIG. 2d shows a cross-sectional of a cylinder 80 with two differently sized sets of spin systems of type shown in FIG. 1a mounted around its circumference.

FIG. 2e shows a cross-sectional side view of secondary system of type indicated in FIG. 2a, with two spin systems of type indicated in FIG. 1a shown diametrically opposite each other around a cylinder 90.

FIG. 2f shows a cross-sectional side view of a secondary system similar to that indicated in FIG. 2e with spin systems of the type shown in FIG. 1a mounted on two truncated cones 102, 104, such that each spin axis forms an angle Φ with the normal to the secondary axis 106.

Excitation System

Different possible configuration of excitation system are shown in FIGS. 3a to 3k. The purpose of the excitation systems is to cause oscillation of the spin systems mounted on a secondary system as the secondary system rotates.

Figure 3A:
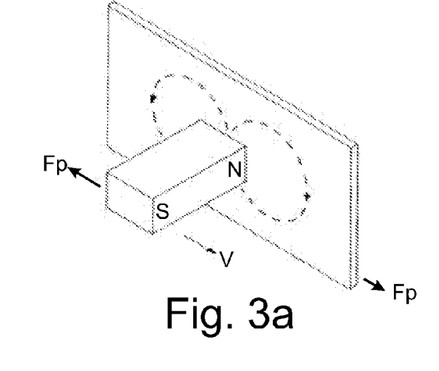
FIGS. 3a to 3h and 3k are sketches explaining the manner in which a periodic torque may be applied to the flywheels as the secondary frame rotates relative to the primary frame.

FIG. 3a is a diagram of a magnet moving past a plate of electrical conducting material with relative velocity V. The movement of the magnet induces electrical eddy currents as indicated by dashed lines and the interaction between the magnet and the magnetic field associated with these eddy current results in equal and opposite forces Fp acting on the plate and magnet.

Figure 3B:
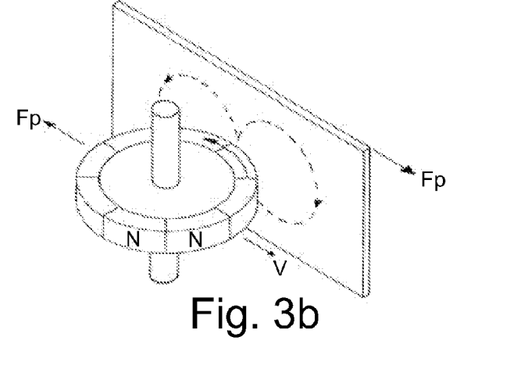

In the diagram of FIG. 3b, a ring of magnets is fitted around a disc with north poles of the magnets facing radially outwards. As the disc is moved, the magnets travels past a plate of electrical conducting material with a relative velocity of V, once again resulting in forces Fp on the plate and the magnets, one of these forces resulting in a torque tending to rotate the disc about its own axis.

Figure 3C:
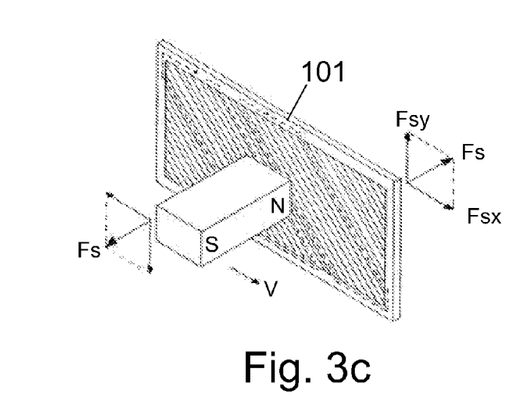

FIG. 3c is a diagram of a magnet travelling with relative velocity V past a frame 101 of conducting material supporting a grill of insulated conductors mounted on the frame at an incline to the direction of movement of the magnet. In this case, forces Fs will act on the frame and the magnet which have x and y components Fsx and Fsy.

Figure 3D:
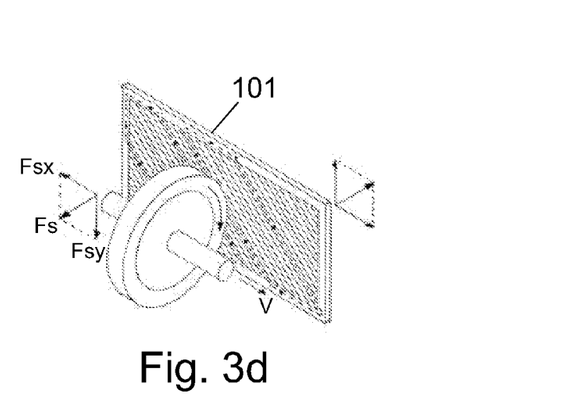

FIG. 3d shows a diagram of a disc similar to that of FIG. 3b moving with velocity V past a frame 101 similar to that shown in FIG. 3c. In this case, the y component Fsy will apply a torque causing the wheel to rotate about its own axis.

Figure 3E:
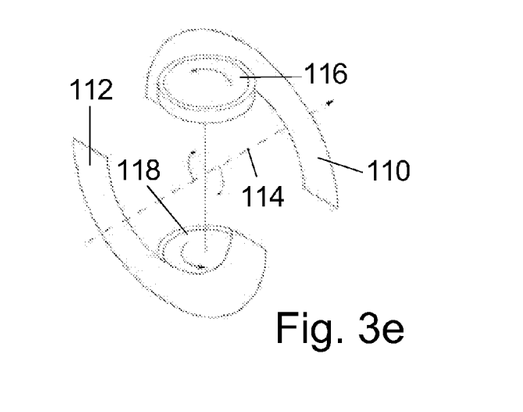

FIG. 3e shows two identical semi-circular plates 110, 112 of electrical conducting material arranged in planes normal to a secondary axis 114. Two identical discs 116 and 118 with magnetic rings are shown with their spin axes rotating around the secondary axis. The interaction with the plate 110 will apply a torque to the disc of the spin system acting in one sense whereas the plate 112 will apply a torque in the opposite sense. Therefore, as the spin system rotates about the axis 114, the disc will be made to oscillate about its own axis.

Figure 3F:
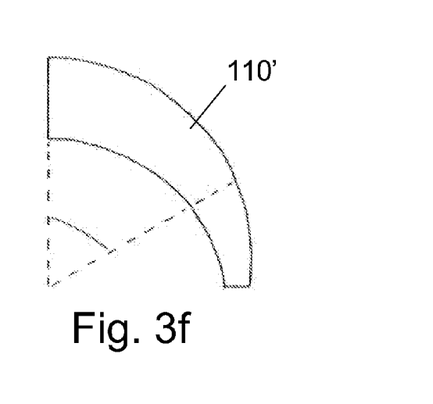

FIG. 3f shows a detail of a modification of the excitation system of FIG. 3e, which shows that the semi-circular plate 110' may have a radial dimension that varies over its arcuate length so that the torque applied to the disc does not change abruptly as it transitions from the plate 110' to the other.

Figure 3G:
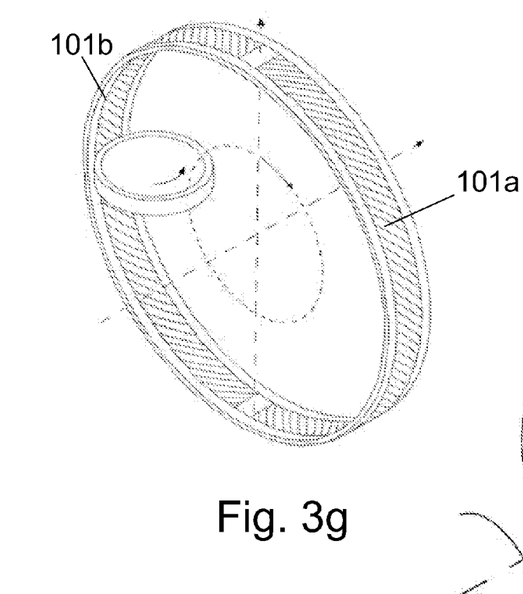

FIG. 3g shows two identical frames 101a and 101b similar to the frame depicted in FIG. 3c joined end to end and bent to form a circular frame. The directions of inclination of the insulated conductors within each frame, are opposing. The drawing also shows a disc with magnetic ring following a locus around the secondary axis.

Figure 3H:
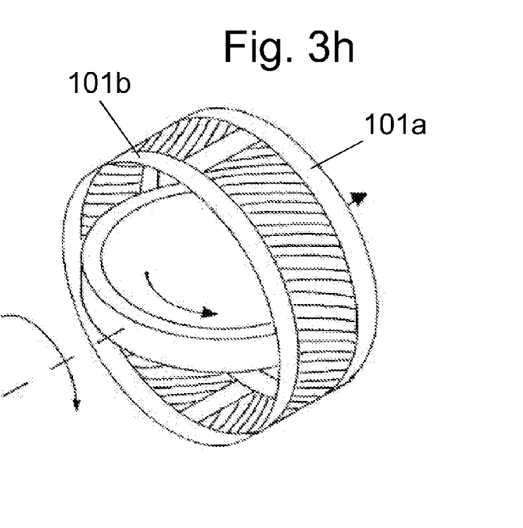

FIG. 3h is a drawing showing a circular frame similar to that depicted in FIG. 3g but having an internal diameter which is slightly larger than the diameter of the disc with a magnetic ring rotating within it. From the principle explained in FIGS. 3c and 3d, it will be clear that in FIGS. 3g and 3h the magnetic ring will experience a reversing torque as it rotates about the axis of the circular frame.

Figure 3J:
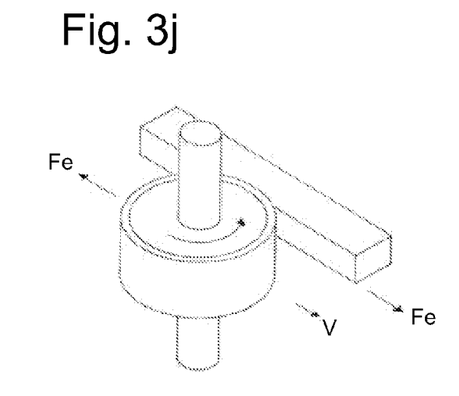
Figure 3K:
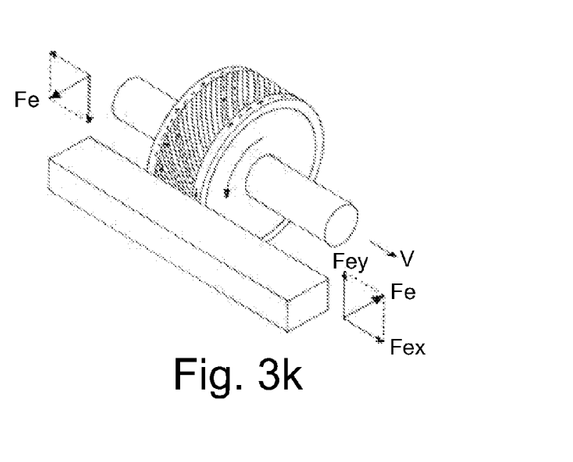

FIGS. 3j and 3k demonstrate that the magnets and the conducting plates can be interchanged in the previously described configurations. FIG. 3j shows that a plate of conducting material arranged around the circumference of a disc and travelling with a velocity v past a magnet will result in opposing forces Fe, one applying a torque to rotate the disc. Hence in FIG. 3k, a frame similar to the circular frame of FIG. 3g mounted on a disc will result in the disc experiencing a torque on account of the component Fey of the reaction between the magnet and the eddy currents induced in the frame. The cylindrical frame has parallel insulated electrical conductors embedded in its surface at an angle to its tangent and two circular electrical rails that connect on either side of the conductors to complete a circuit.

Primary Frame

Figure 4A:
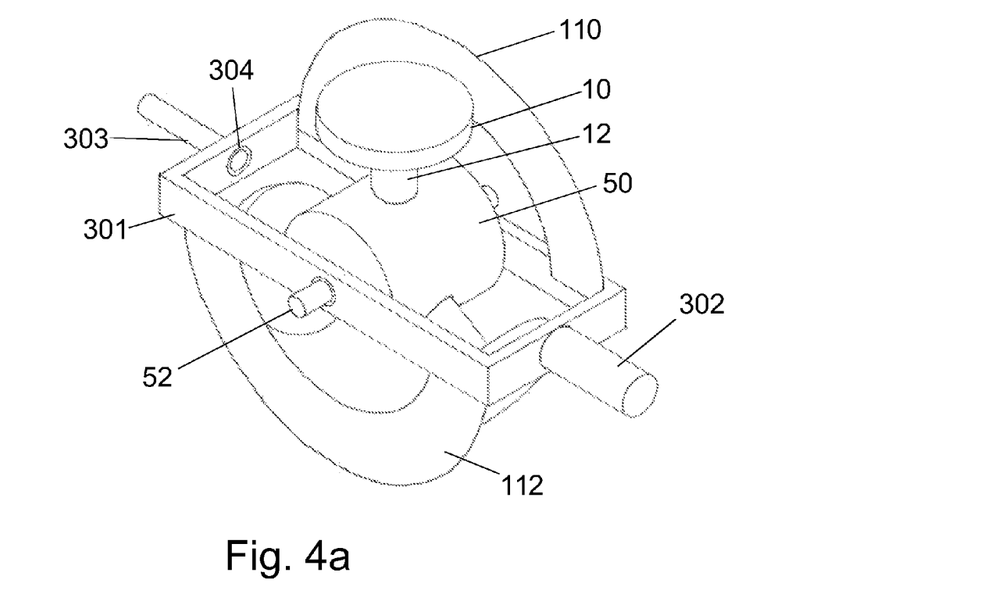
FIGS. 4a and 4b show different secondary frames mounted within a primary frame.

FIG. 4a shows the secondary frame of FIG. 2a and an excitation system of FIG. 3e mounted within a rectangular primary frame 301 so that it is free to rotate on its axis. A primary axle 302 is attached to one end of the frame 301, while a free axle 303 rotates in a bearing 304 at the opposite end of the frame 301.

Figure 4B:
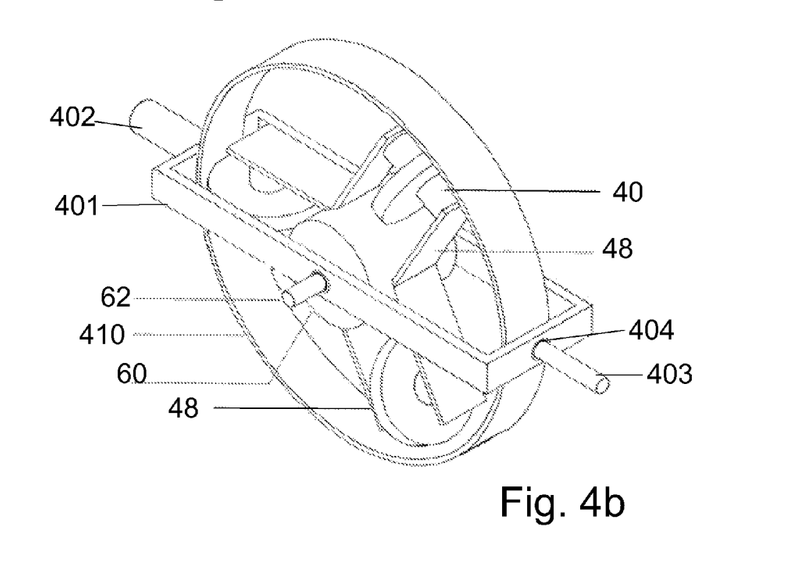

In FIG. 4b a secondary frame 60 as depicted in FIG. 2b is mounted within a rectangular primary frame 401 so that it is free to rotate on its axis 62. As in the case of the primary frame of FIG. 4a, the primary frame 401 has a primary axle 402 and a free axle 403 supported in a bearing 404. A circular frame 410, which is the same as that shown in FIG. 3g, is mounted within the primary frame 401 such that it totally encloses the secondary frame and serves as the excitation system Transmission System A transmission system is needed to couple the secondary frame to the free axle 303 or 403, the latter serving as an input or output shaft of the gyroscopic torque converter.

Figure 5A:
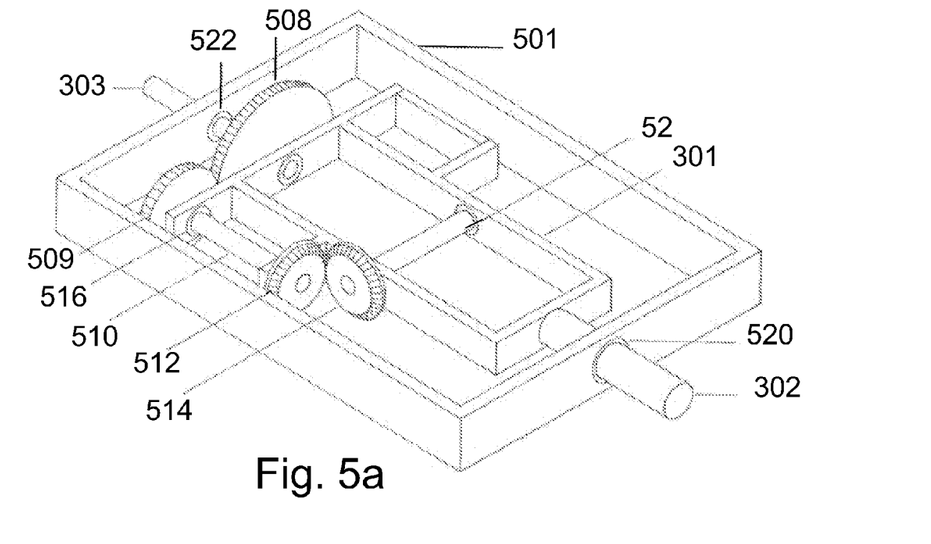
FIGS. 5a and 5b show possible configurations of a transmission system for coupling the secondary frame to an output shaft of the torque converter.

FIG. 5a is an isometric drawing showing a possible configuration of a transmission system. In FIG. 5a, a rectangular primary frame 301 as shown in FIG. 4a is supported within a stationary frame 501 by its primary axle 302 and its free axle 303, both of which are received in bearings to enable the primary frame 301 to rotate around its own longitudinal axis. A large spur gear 508 on the free axle 303 is coupled for rotation with the axle 52 of the secondary frame via a transmission consisting of spur gear 509, a shaft 510 and bevel gears 512 and 514, the latter bevel gear being mounted on the axle 52 of the secondary frame. The shaft 510 is rotatably supported in flanges 516 projecting from one side of the primary frame 301. Rotation of the secondary frame about the axle 52 is thus transmitted to the free axle 303 of the primary frame. For this configuration the angular velocity of the free axle is a function of both the primary frame and secondary frame angular velocities.

Figure 5B:
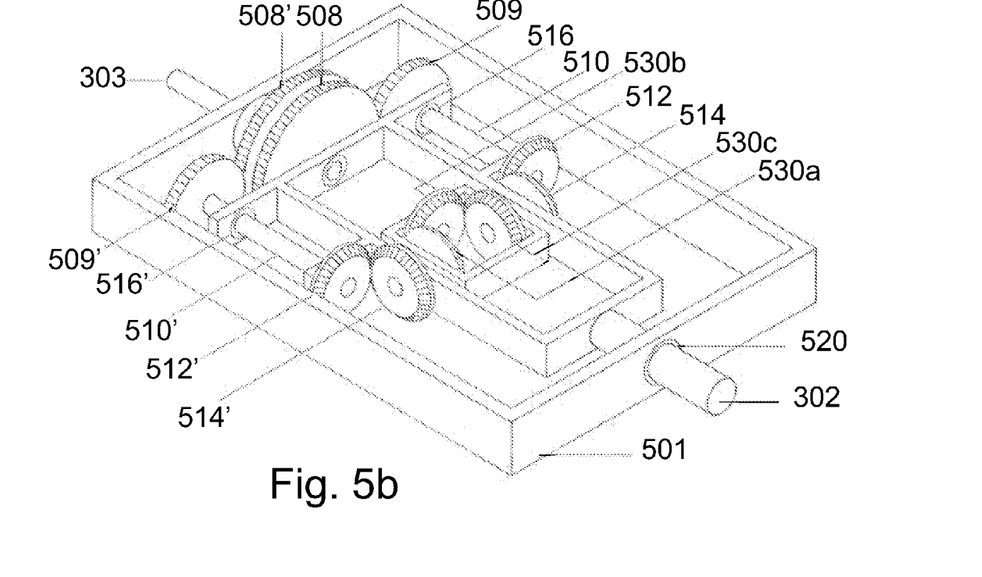

FIG. 5b is another isometric drawing of a rectangular primary frame 301 similar to that shown in FIG. 5a with an alternative transmission system. Like parts have been allocated like reference numerals and to avoid repetition a prime has been added to the reference numeral of each component that is a duplicate of a component present in the embodiment of FIG. 5a. Three bevel gears 530a, 530b and 530c are included in the secondary system. A large spur gear 508 on the free axle 303 is coupled for rotation with bevel gear 530c via a transmission consisting of spur gear 509, a shaft 510 and bevel gears 512 and 514, the latter bevel gear being mounted on the axle as bevel gear 530c. The shaft 510 is rotatably supported in flanges 516 projecting from one side of the primary frame 301. A large spur gear 508' mounted on the stationary frame is coupled for rotation with bevel gear 530a via a transmission consisting of spur gear 509', a shaft 510' and bevel gears 512' and 514', the latter bevel gear being mounted on the axle as bevel gear 530a. The shaft 510' is rotatably supported in flanges 516' projecting from one side of the primary frame 301. The intermediate bevel gear 530b is journal mounted in the secondary frame and connects the two transmissions. In this configuration the angular velocity of the free axle is a function of the secondary system angular velocity only.

Figure 6A:
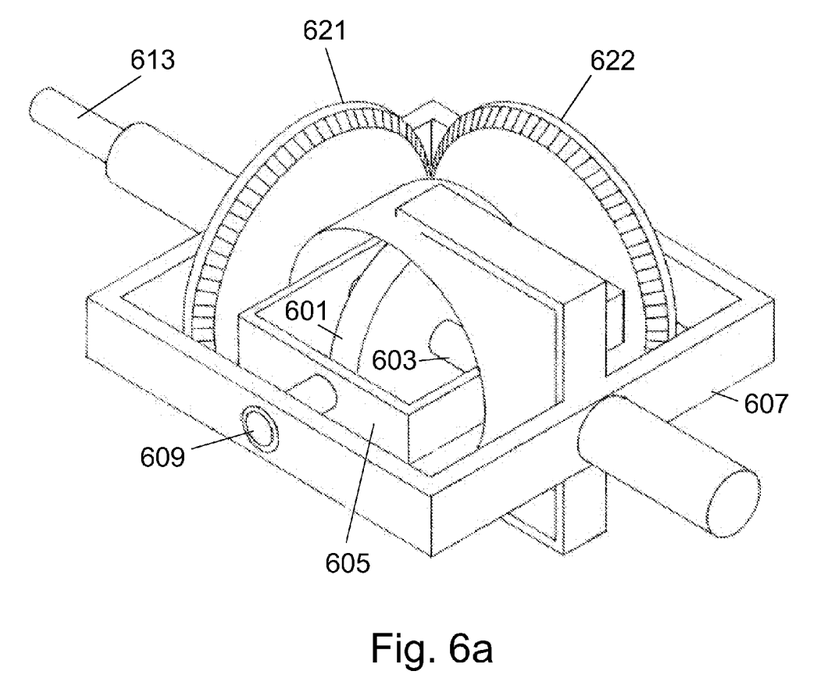
FIGS. 6a to 6c show other configurations for the torque converter, with multiple secondary frames each supporting single masses.

FIG. 6a is an isometric drawing showing a single disc 601 connected by two cylindrical springs 603 to a secondary frame 605. The secondary frame 605 is supported within a primary frame 607 by two secondary shafts 609, of which only one can be seen in the drawing. The excitation system comprises a circular frame 611, as shown in FIG. 3h, mounted on the primary frame 607. The drive coupling between the free axle 613 and the axle of the secondary frame 605 comprises two large bevel gears (621 & 622).

Figure 6B:
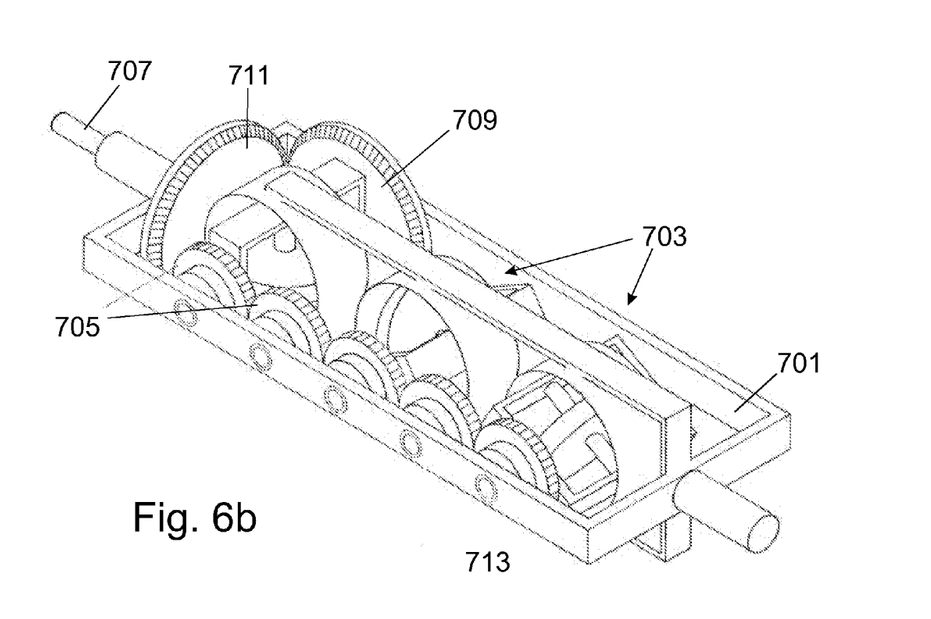

FIG. 6b shows a large rectangular primary frame 701 elongated in the direction of the primary axis. Three secondary systems 703, each as shown in FIG. 6a are supported in the frame 701 and connected via a series of spur gears 705. Transmission to the free axle 707 is via two bevel gears 709, 711 and Excitation is via individual circular frames 713, as shown in more detail in FIG. 3h.

Figure 6C:
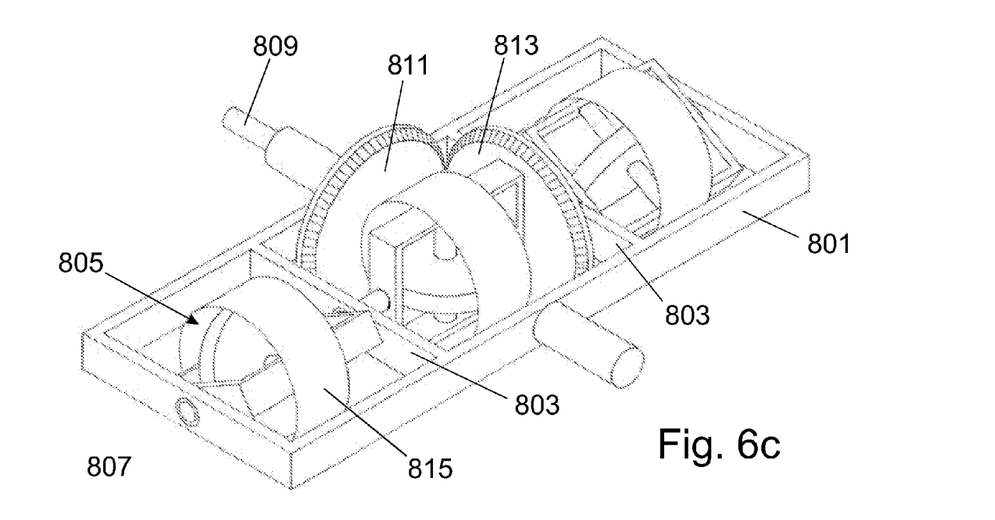

FIG. 6c shows a rectangular primary frame 801, elongated along the secondary axis, with two partition walls 803. Three secondary systems 805 are supported in the primary frame and interconnected via secondary shafts 807. Transmission to the free axle 809 is via two bevel gears and excitation via individual circular frames 815.

Rotation of the secondary frame will result in oscillation of each spin system and this will result in a torque being applied to the primary frame. Because the direction of spin is changing as the spin axis rotates, the torque will always act in the same direction if the secondary frame rotates at the speed of oscillation of the spin system. The torque will however fluctuate cyclically in magnitude and using a single spin system one cannot obtain a smooth output torque from a constant input torque on either the primary or secondary axis.

However, one can obtain a smooth torque delivery if three identical spin systems are arranged around the secondary frame as shown in FIGS. 4a, 4b, 6b & 6c that their spin axes are normal to the secondary axis and lie at 120° to one another. The design also excites the torsional vibration of each spin system 120° out of phase from the other two spin systems.

Therefore with this arrangement it is possible to provide smooth gyro-coupling between the primary and secondary axis with the magnitude of the coupling factor increasing drastically when the secondary angular velocity is close to the resonant frequency of the spin systems.

In addition, when the torque converter is operating close to the resonant frequency of the spin systems, periodic excitation torques become substantially sinusoidal, which limits sub-harmonics in the output torque.

A torque converter of the invention is suitable for use in powering a synchronous generator or induction generator from an alternative energy device such as a wind or wave turbine. This would give a constant voltage and frequency output with variable current.

The torque converter of the invention can also be used to achieve a constant torque drive. In this case the input torque and constant angular velocity are applied to the secondary axle. The closer the secondary system is to resonance, the greater the torque and power that can be transferred from the driving to the driven equipment, up to the maximum power limitation of the driver.

The converter may therefore be used to couple constant speed motors to many different types of driven equipment. This results in the advantages that the motor may be allowed to operate at full speed no load, when the driven equipment is stationary. This protects the driver if the load, for example a circular saw becomes jammed and allows a constant speed motor to apply a high starting torque to a load.

It will be noted from the described applications of the invention that while it has been described by reference to the input torque being applied to the primary frame and the output torque being taken from the secondary frame, these connections are interchangeable. Also, while the invention has been described by reference to permanent magnets, electromagnets may be used instead and current applied to them through slip rings and brushes or commentators on the axles of at least one of the primary and secondary frames.

The invention claimed is:

1. A torque converter comprising:
a stationary mount,
input and output shafts,
a primary frame supported by the stationary mount for rotation about a primary axis and coupled for rotation with one of the input and output shafts,
a secondary frame supported by the primary frame for rotation about a secondary axis perpendicular to the primary axis and coupled for rotation with the other of the input and output shafts,
a plurality of flywheels supported by the secondary frame with their spin axes disposed at an angle to one another in the same plane, or in mutually parallel planes, and
torsional springs acting between the flywheels and the secondary frame to cause the flywheels to oscillate in use, the rotation of the flywheel resulting in a gyroscopic torque coupling between the primary and secondary frames;
an excitation system mounted on the primary frame for applying to each flywheel a periodic torque that varies with the angular velocity of the secondary frame and the angular position of the axis of the flywheel relative to the secondary axis, so as to cause each flywheel to oscillate in response to relative rotation between the primary and secondary frames.

2. A torque converter as claimed in claim 1, wherein the plurality of flywheels comprises at least one set of three flywheels, the set is supported by at least one secondary frame, and the spin axes of the three flywheels being arranged at 120° to one another.

3. A torque converter as claimed in claim 2, wherein the torsional springs are selected to provide the three flywheels with the same natural frequency of oscillation, whereby a transfer of torque is achieved between the primary and secondary frames when the frequency of rotation of the secondary frame is at or near this natural frequency.

4. A torque converter as claimed in claim 2, wherein the spin axes of the flywheels are inclined at a common angle from a plane normal to the axis of rotation of the secondary frame.

5. A torque converter as claimed in claim 2, wherein the spin axes of the flywheels lie in different planes normal to the secondary axis, the projections of the axes onto a single plane lying at an angle of 120° to one another.

6. A torque converter as claimed in claim 1, having a transmission system mounted on the primary frame for coupling the secondary frame for rotation with one of the input and output shafts, such that the angular velocity of the output shaft is a function of the angular velocities of both the secondary frame and primary frame.

7. A torque converter as claimed in claim 6, wherein the transmission system is arranged such that the angular velocity of the output shaft is a function of only the secondary frame angular velocity.

8. A torque converter as claimed in claim 1, wherein the excitation system comprises a ring of magnets distributed around the circumference of each flywheel and plates of electrically conducting material secured to the primary frame on each side of the secondary frame, such that the magnetic interaction between the plates and the rotors applies a periodic torque to the rotors as the secondary frame rotates relative to the primary frame.

9. A torque converter as claimed in claim 1, wherein the excitation system comprises a ring of magnets mounted around the circumference of each flywheel and two mirror image half cylindrical excitation frames attached to the primary frame, each frame having parallel insulated electrical conductors embedded within its surface inclined relative to the tangent of the cylindrical excitation frames, the conductors and the edges of the frame forming electrical circuits in which eddy current are induced by the magnets mounted on the associated flywheel.

10. A torque converter as claimed in claim 1, wherein the excitation system comprises a cylindrical plate of electrically conducting material fitted around the circumference of each flywheel and magnets attached to the primary frame on each side of the secondary frame.

11. A torque converter as claimed in claim 1, wherein the excitation system comprises a cylindrical frame fitted to each flywheel, the cylindrical frame having parallel insulated electrical conductors embedded within its surface and arranged at a slant to its tangent so that the conductors and the edges of the frame form electrical circuits;
and magnets mounted on the primary frame on each side of the secondary frame so that the magnetic interaction between the frames on the flywheels and the magnets applies a periodic torque to the flywheels as the secondary frame rotates relative to the primary frame.

12. A torque converter as claimed in claim 8, wherein the magnets are electromagnets.

13. A torque converter as claimed in claim 9, wherein the magnets are electromagnets.

14. A torque converter as claimed in claim 10, wherein the magnets are electromagnets.

15. A torque converter as claimed in claim 11, wherein the magnets are electromagnets.

* * * * *

UNITED STATES PATENT AND TRADEMARK OFFICE
CERTIFICATE OF CORRECTION

| | |
|---|---|
| PATENT NO. | : 8,297,138 B2 |
| APPLICATION NO. | : 12/522573 |
| DATED | : October 30, 2012 |
| INVENTOR(S) | : Harrison |

It is certified that error appears in the above-identified patent and that said Letters Patent is hereby corrected as shown below:

Title page:

Item (76), Inventor, replace "Dunkan" with -- Duncan --

Signed and Sealed this
Twenty-third Day of July, 2013

Teresa Stanek Rea
*Acting Director of the United States Patent and Trademark Office*